United States Patent [19]

Leoni et al.

[11] Patent Number: 4,777,238

[45] Date of Patent: Oct. 11, 1988

[54] POLYAMIDE RESIN FROM DIMER/TRIMER ACID AND N-ALKYL DIAMINE

[75] Inventors: Roberto Leoni, Milan, Italy; Werner Gruber, Korschenbroich, Fed. Rep. of Germany; Angela Rossini, Milan, Italy

[73] Assignee: Henkel Kommanditgesellschaft auf Aktien, Duesseldorf, Fed. Rep. of Germany

[21] Appl. No.: 33,428

[22] Filed: Apr. 1, 1987

Related U.S. Application Data

[63] Continuation-in-part of Ser. No. 905,714, Sep. 8, 1986, abandoned.

[30] Foreign Application Priority Data

Sep. 7, 1985 [DE] Fed. Rep. of Germany ....... 3531941

[51] Int. Cl.$^4$ ............................................. C08G 69/34
[52] U.S. Cl. ............................... 528/339.3; 428/474.4; 428/475.2; 528/336; 528/340
[58] Field of Search ...................... 528/339.3, 340, 336

[56] References Cited

U.S. PATENT DOCUMENTS 4,218,351 8/1980 Rasmussen ............................ 260/18

FOREIGN PATENT DOCUMENTS 2754233 6/1978 Fed. Rep. of Germany .

*Primary Examiner*—Harold D. Anderson
*Attorney, Agent, or Firm*—Ernest G. Szoke; Henry E. Millson, Jr.

[57] ABSTRACT

Thermoplastic polyamide resins showing improved substrate adhesion and consisting essentially of polycondensates of the following components:

(a) from 10 to 50 mole percent dimer fatty acids, having a trimer fatty acid content of from 10 to 20 mol percent;

(b) from 25 to 45 mole percent of one or more aliphatic, aromatic and/or cyclic $C_2$-$C_{40}$ diamines which are diprimary diamines, diamines containing secondary amino groups and alkyl substituents with no more than 8 carbon atoms on the N-atom, or heterocyclic diamines capable of diamide formation, (c) from 5 to 25 mole percent of aliphatic diamines capable of diamide formation and N-alkyl-substituted on at least one N-atom, containing from 2 to 10 C-atoms and from 10 to 25 carbon atoms in the N-alkyl group, and (d) from 0 to 40 mole percent aliphatic $C_6$-$C_{22}$ dicarboxylic acids.

11 Claims, No Drawings

POLYAMIDE RESIN FROM DIMER/TRIMER ACID AND N-ALKYL DIAMINE

This invention is a continuation-in-part application of Ser. No. 905,714, filed Sept. 8, 1986, now abandoned.

BACKGROUND OF THE INVENTION

1. Field of the Invention

This invention relates to new polyamide resins and to their use as hotmelt adhesives. In addition to dimerized fatty acids in the acid portion of the molecule, the polyamide resins of this invention are produced using aliphatic diamines capable of diamide formation which are alkyl-substituted on at least one nitrogen atom.

2. Description of Related Art

Hotmelt adhesives are becoming increasingly important in the adhesives field. These adhesives are advantageous since they achieve necessary bond strength by cooling from the melt and, as such, are suitable for high-speed production operations. A further advantage resides in the fact that the use of equipment to protect against solvent vapors is unnecessary. Moreover, the prolonged drying times needed when aqueous adhesives are used, are substantially shortened when hotmelts are used.

An important class of hotmelts are the polyamides. Of these, polyamides based on dimerized fatty acids have acquired particular significance. Among the polyamides based on dimerized fatty acids, those containing dimerized fatty acids in the acid component and ether diamines in the amine component are particularly important as a result of their favorable low-temperature properties.

Thus, for example, German Application No. 27 54 233 describes copolyamide resins which contain in the acid portion of the molecule a special mixture of polymeric fatty acids (dimer fatty acid) and aliphatic dicarboxylic acids containing from 6 to 12 carbon atoms and, on the base side, a mixture of saturated aliphatic diamines and polyoxyalkylene diamines. These products have an embrittlement temperature of $-25°$ C.

Similar resins are described in U.S. Pat. No. 4,218,351 which relates to polyamides containing, in addition to the usual raw materials, from 5 to 30 mole percent dimer fatty acid and from 0.25 to 12.5 mole percent amorphous oligomers (polyoxyalkylene diamines).

Although the polyetherdiamine-containing polyamides discussed above are adequate for many applications, a need continues to exist to improve substrate adhesion while at the same time retaining, or improving, low-temperature behavior. There is also a need for products having a lower water uptake capacity.

DESCRIPTION OF THE INVENTION

Other than in the operating examples, or where otherwise indicated, all numbers expressing quantities of ingredients or reaction conditions used herein are to be understood as modified in all instances by the term "about".

The present invention provides new and improved polyamides which may be used as hotmelt adhesives. More specifically, the invention provides thermoplastic polyamide resins with improved substrate adhesion properties, said resins being polycondensates of the following components:

(a) from 10 to 50, preferably from 25 to 50 mole percent of at least one dimer fatty acid having a trimer fatty acid content of from 10 to 20 mole percent;

(b) from 25 to 45 mole percent of at least one aliphatic, aromatic or cyclic diamine having from 2 to about 40 carbon atoms, said diamines including diprimary diamines, diamines containing secondary amino groups and alkyl substituents with no more than 8 C-atoms on the N-atom; and/or heterocyclic diamines capable of diamide formation;

(c) from 5 to 25 mole percent of at least one aliphatic diamine having from 2 to about 10 carbons, being substituted on one or both N-atom with an alkyl group having from about 10 to about 25 carbon atoms, and being capable of diamide formation. The alkyl group may be a straight-chain or branched chain alkyl group;

(d) from 0 to 40, preferably from 0 to 25 mole percent of at least one aliphatic dicarboxylic acid having from about 6 to about 22 carbon atoms.

The invention also relates to the use of such polyamide resins as hotmelt adhesives.

Broadly, the polyamide resins of this invention are composed of an acid portion, preferably a mixture of acids, and a mixed amine portion.

The essential constituent of the acid portion of the polyamide resins of this invention is component (a) above, the dimer fatty acid. As used herein, the term dimer fatty acid relates to products having the dimerization product of one or more unsaturated fatty acids as the principal constituent thereof. Dimer fatty acids are well known in the polyamide art. They are products which typically exist as mixtures. For example, dimer fatty acids normally contain a percentage of trimer fatty acids and a relatively small percentage of monofunctional fatty acids. Dimer fatty acids, which are suitable for the purposes of the invention, are those containing from about 10 to about 20 mole percent of trimer fatty acids. In this connection, it is known in the art that an excessive content of trimer fatty acid, which can lead to gelation of polyamides, can be partially offset by the addition of chain terminators. Monofunctional fatty acids or monofunctional amines are examples of such chain terminators. Persons skilled in the art will readily appreciate how such chain terminators can be employed for this purpose.

Dimer fatty acids, obtained by dimerization of $C_{18}$-fatty acids, and containing 36 carbon atoms, have been found to be particularly suitable in the practice of this invention. However, dimer fatty acids having shorter or longer carbon chain length can also be used herein.

The polyamide resins of this invention may contain aliphatic dicarboxylic acids having a carbon chain length of from about 6 to about 22 carbon atoms as a further optional acid component, i.e. optional component (d) above. Preferably, the resins of the invention contain saturated dicarboxylic acids having 6 to 12 carbon atoms and, more preferably, linear dicarboxylic acids containing terminal carboxyl groups. Thus, adipic acid, heptane dicarboxylic acid, octane dicarboxylic acid, azelaic acid, nonane dicarboxylic acid, sebacic acid, undecane dicarboxylic acid, dodecane dicarboxylic acid and/or brassylic acid and higher homologs thereof are particularly suitable for use herein. The selection of the type and quantity of the dicarboxylic acids to be used is, in part, determined by the properties which are desired in the polyamide resin product. Thus, for example, where it is desired to produce polyamide resins having relatively low melting points, only very small amounts, if any, of aliphatic dicarboxylic acids having from 6 to 22 carbon atoms, will be used in their production. Where, however, polyamide resins having high melting points are desired, larger amounts of these dicarboxylic acids, particularly the shorter-chain types, for example adipic acid, within the molar limits indicated herein, should be employed.

The polyamide resins of this invention contain as amine component (b) from 25 to 45 mole percent of one of more aliphatic, aromatic and/or cyclic $C_2$-$C_{40}$ diamines. Diamines suitable for use herein include diprimary diamines; diamines containing one or two secondary amino groups with an alkyl substituent having from 1 to 8 carbon atoms attached to the N-atom; or a heterocyclic diamine capable of diamide formation. Diamines containing from 2 to 20 carbon atoms are used in the preferred embodiment of the invention, with lower straight-or branched-chain aliphatic or monocyclic diprimary diamines or monocyclic, heterocyclic diamines being particularly preferred for use herein. The diamines suitable for use in the practice of this invention may be divided into various groups. Of considerable importance are diprimary aliphatic diamines containing terminal amino groups. Of these, amines which correspond in their carbon skeleton to the abovementioned dicarboxylic acids, including dimer fatty acids, and to the shorter-chain homologs thereof are preferred. Accordingly, for the purposes of this invention diamines such as ethylenediamine, propylenediamine, hexamethylenediamine, and homologs thereof, as well as dimer fatty diamines (obtainable by conversion of dimer fatty acids into the dinitriles and subsequent hydrogenation of the two nitrile groups) are of significant importance. Another group of diamines which can be used are aromatic diamines. Suitable aromatic diamines are those derived from benzene, toluene or otherwise substituted aromatics, for example 2,6-tolylenediamine, 4,4-diphenylmethanediamine and/or xylylenediamine. The corresponding cyclohexane derivatives may also be used.

Another class of diamines which can be used in producing the polyamide resins of this invention are diamines containing one or two secondary amino groups having a $C_1$-$C_8$ alkyl group attached to the N-atom. Diamines such as these are derived from the diprimary aliphatic diamines discussed above. The $C_1$-$C_8$ alkyl group is preferably a short-chain alkyl group, for example, an alkyl group containing 1 to 3 carbon atoms, such as methyl, ethyl, or propyl.

Another group of diamines which may be used in the polyamide resins of this invention are heterocyclic diamines capable of diamide formation, preferably aliphatic heterocycles. The most important representative of this group is piperazine.

The polyamide resins acording to the invention contain, as their most important constituent, component (c), i.e. from 5 to 25 mole percent of at least one straight or branched chain aliphatic diamine capable of diamide formation which contains from 2 to about 10 carbon atoms and which has an alkyl group of about 10 to about 25 carbon atoms attached to one or both of the N-atoms. These amines may be derived from the aliphatic diprimary diamines discussed above. These diamines are preferably unbranched, and are preferably ehtylenediamine, propylenediamine, tetramethylenediamine, pentamethylenediamine, hexamethylenediamine, or higher homlogs thereof, which contain a $C_{10}$-$C_{25}$ alkyl group on at least one of the N-atoms.

The alkyl group which is substituted on at least one of the N-atoms contains from 10 to 25 carbon atoms and may be linear, branched or cyclic, with straight-chain alkyl groups being preferred. Among the straight-chain alkyl groups, those containing an even number of carbon atoms are most preferred. The aliphatic diamines capable of diamide formation and N-alkyl-substituted on at least one side may be used in the form of discrete compounds. However, it is preferred to use mixtures. Thus, products in which the N-alkyl group has chain length and chain length distribution similar to that of a hydrogenated fatty acid mixture are preferred. Particularly preferred N-alkyl-substituted aliphatic diamines contain N-alkyl sustituents with chain lengths corresponding to that of a hydrogenated tallow fatty acid or hydrogenated tall oil fatty acid.

The polyamide resins of this invention can be produced using acid components and amine components in stoichiometric quantities. For use as hotmelts, however, it is desirable in the majority of applications that residual amino groups or residual acid groups be present. To achieve this, an excess of acid or base, which makes up no more than 10 equivalent percent of all functional groups, will be used. Base-terminated resins have amine numbers of up to about 50, preferably from 2 to 20 and more preferably from 2 to 15. Acid-terminated resins should have an acid number of up to about 20 and preferably from 2 to 10.

The polyamide resins of this invention have a number average molecular weight of from about 5,000 to about 15,000 and, preferably, from about 8,000 to about 12,000. In order to obtain products having a relatively high molecular weight, the acid and base components should be used in substantially equivalent quantities. To produce products with relatively low molecular weights, one of the components should be used in excess. Another method of reducing molecular weight is to add chain terminators, such as monofunctional fatty acids or monofunctional amines. On the other hand, the molecular weight may be increased by using a small percentage of a trifunctional component, for example, a trimer fatty acid.

The polyamide resins of the invention thus differ from products of lower molecular weight which have a liquid to wax-like solid consistency. The resins of the invention have a tensile strength of from 20 to 45 kg/cm$^2$, generally from 30 to 40 kg/cm$^2$, and a breaking elongation of from 600 to 950%, generally from 700 to 900%.

The polyamide resins of this invention have a softening point (as determined in accordance with ASTM E-28) in the range of from about 60 to about 200° C. and, preferably, in the range of from abut 80 to about 150° C. Nevertheless, the low-temperature properties of the compounds are excellent. The requirements of the mandrel test (winding a test specimen measuring 20 mm×170 mm for a thickness of 1 mm through 360° C. about a 25.6 mm diameter brass cylinder) are satisfied at −30° C. and preferably at −40° C. One particular advantage of the products produced herein resides in their improved substrate adhesion. More particularly, better substrate adhesion values compared with the prior art are obtained with materials that are difficult to bond, such as PVC, polyester films or aluminum. In addition, the water uptake of the products is considerably lower than is the case with polyamide resins based on polyether diamines.

The invention will be illustrated but not limited by the following examples.

EXAMPLES

The condensation reaction was carried out under nitrogen with stirring in a tubulated glass flask. The carboxylic acids introduced were first heated to a temperature of about 60° C. and the other reaction components subsequently added. The contents of the flask were then heated to a temperature of about 230° C. and maintained at that temperature for a period of about one hour. The flask was then evacuated to 15 mbar over the next hour at constant temperature. After cooling to about 102° C., the reaction product was removed and isolated to determine its properties.

The quantities used in grams and also the amine number of the reaction product are shown in the following table beneath the particular example number. The table also shows the softening point (R+B, ASTM E-28) and the flexibility values in °C. obtained at low temperatures. Flexibility was determined by the mandrel test in which a test specimen measureing 20×170 mm for a thickness of 1 mm is wound through 360° about a 25.6 mm diameter brass cylinder. The tests were carried out at decreasing temperatures (test specimen and cylinder in temperature equilibrium) to find the lowest temperature at which three out of five test specimens withstood the madreal test without breaking.

|  | No. 1 grams | No. 2 grams | No. 3 grams |
|---|---|---|---|
| Dimer fatty acid | 285 | 236 | 236 |
| Azelaic acid | — | 16 | 16 |
| Ethylenediamine | 24 | 24 | 18 |
| N—alkyl propylenediamine | 33.4 | 33.4 | 75.2 |
| Softening Point (°C.) | 100 | 140 | 120 |
| Amine number | 4.1 | 3.2 | 6.0 |
| Flexibility (°C.) | −35 | −40 | −45 |

The dimer fatty acid used in all three examples and in comparison examples A and B below are obtained by the dimerization of $C_{18}$ fatty acids.

The N-alkyl propylenediamine used in all three examples contained as the alkyl group R an alkyl group corresponding to tall oil fatty acid in chain length and chain length distribution.

R—NH—(CH$_2$)$_3$—NH$_2$

COMPARISON EXAMPLES

|  | Example A Mole Percent | Example B Mole Percent |
|---|---|---|
| Dimer fatty acid | 50 | 41 |
| Azelaic acid | — | 9 |
| Ethylenediamine | 50 | 50 |
| Softening Point (°C.) | 110° C. | 165° C. |
| Amine number | 2.0 | 3.1 |
| Flexibility (°C.) | 0 | −10 |

To determine the bonding properties, tensile shear strengths were determined in accordance with DIN No. 52 283.

The following materials were bonded:
Aluminum-to-aluminium (Al/Al)
PVC-to-PVC (rigid PVC)
and a difficult polyester (Mylar) film.

The values determined in N/MM$^2$ are shown in the following table.

TABLE

Bonding properties of the new polyamide resins in N/mm$^2$ according to DIN 52 283

| Substrate | Example 1 | Example 2 | Example 3 | Comparison A | Comparison B |
|---|---|---|---|---|---|
| Al/Al | 7.6 | 10.8 | 9.8 | 4.5 | 5.4 |
| PVC/PVC | 8.5 | 7.0 | 9.1 | 1.9 | 2.3 |
| Mylar/Mylar | 2.5 | 3.0 | 2.7 | 0.4 | 0.8 |

What is claimed is:

1. A thermoplastic polyamide resin which has improved substrate adhesion properties and which is a polycondensate of the following components:
   (a) from about 10 to about 50 mole percent of at least one dimer fatty acid having a trimer fatty acid content of from about 10 to about 20 mol percent;
   (b) from about 25 to about 45 mole percent of at least one diamine selected from the group consisting of aliphatic, aromatic, and cyclic diamine having a carbon chain length of from 2 to about 40 carbon atoms and which is a diprimary diamine, a diamine containing one or two secondary amino groups having a $C_1$-$C_8$ alkyl group on the N-atom, or a heterocyclic diamine capable of diamide formation;
   (c) from about 5 to about 25 mole percent of at least one aliphatic diamine containing from 2 to about 10 carbon atoms, which is capable of diamide formation, and which has substituted on one or both N-atoms a straight or branched chain alkyl group having from about 10 to about 25 carbon atoms; and
   (d) from 0 to about 40 mole percent of at least one aliphatic dicarboxylic acid having from about 6 to about 22 carbon atoms.

2. A polyamide resin of claim 1 which is an acid-terminated resin having an acid excess of up to 10 equivalent percent of all functional groups, said acid-terminated resin having an acid number of up to 20.

3. The polyamide resin of claim 2 having an acid number in the range of from about 2 to about 10.

4. A polyamide resin of claim 1 which is a base-terminated resin having a base excess of up to 10 equivalent percent of all functional groups, said base-terminated resin having an amine number of up to 50.

5. The polyamide resin of claim 4 having an amine number in the range of from about 2 to about 15.

6. The polyamide resin of claim 1 having a number average molecular weight in the range of from about 5,000 to about 15,000.

7. The polyamide resin of claim 6 having a number average molecular weight in the range of from about 8,000 to about 12,000.

8. The polyamide resin of claim 1 polycondensed with a small quantity of a nonfunctional fatty acid.

9. The polyamide resin of claim 1 wherein component (d) is a saturated aliphatic dicarboxylic acid containing from 6 to about 12 carbon atoms.

10. The polyamide resin of claim 1 wherein the at least one diamine of component (b) has a carbon chain length of from 2 to 20 carbon atoms.

11. The polyamide resin of claim 10 wherein the said at least one diamine is a lower straight- or branched-chain aliphatic or monocyclic diprimary diamine or a monocyclic heterocyclic diamine.

* * * * *